United States Patent
Penrod et al.

(10) Patent No.: US 12,126,977 B1
(45) Date of Patent: Oct. 22, 2024

(54) SYSTEMS AND METHODS FOR DYNAMICALLY MODIFYING AUDIO CONTENT USING VARIABLE FIELD OF VIEW

(71) Applicant: GoPro, Inc., San Mateo, CA (US)

(72) Inventors: Eric Steven Penrod, Brentwood, CA (US); Erich Tisch, San Francisco, CA (US); Timothy Dick, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 169 days.

(21) Appl. No.: 17/894,805

(22) Filed: Aug. 24, 2022

Related U.S. Application Data

(60) Provisional application No. 63/239,068, filed on Aug. 31, 2021.

(51) Int. Cl.
*H04R 5/04* (2006.01)
*G06V 20/50* (2022.01)
*H04R 5/027* (2006.01)

(52) U.S. Cl.
CPC ............. *H04R 5/04* (2013.01); *G06V 20/50* (2022.01); *H04R 5/027* (2013.01)

(58) Field of Classification Search
None
See application file for complete search history.

(56) References Cited

U.S. PATENT DOCUMENTS

| | | | |
|---|---|---|---|
| 2010/0245624 A1* | 9/2010 | Beaucoup | H04N 21/4334 348/240.99 |
| 2016/0104495 A1* | 4/2016 | Peters | G10L 19/008 381/22 |
| 2017/0332170 A1* | 11/2017 | Laaksonen | H04R 3/005 |
| 2022/0201395 A1* | 6/2022 | Salehin | G02B 27/0093 |
| 2023/0096873 A1* | 3/2023 | Vilkamo | H04N 21/4398 381/303 |

FOREIGN PATENT DOCUMENTS

| | | | | |
|---|---|---|---|---|
| EP | 3742185 A1 * | 11/2020 | | G01S 3/8025 |
| WO | WO-2013181115 A1 * | 12/2013 | | H04S 7/307 |
| WO | WO-2023051126 A1 * | 4/2023 | | G10L 21/0208 |

* cited by examiner

*Primary Examiner* — Qin Zhu
(74) *Attorney, Agent, or Firm* — ESPLIN & ASSOCIATES, PC

(57) ABSTRACT

An image capture device may capture multiple audio content during capture of visual content. The field of view of the visual content may be used to generate modified audio content from the multiple audio content. The modified audio content may provide sound for playback of the visual content with the field of view.

20 Claims, 8 Drawing Sheets

SYSTEMS AND METHODS FOR DYNAMICALLY MODIFYING AUDIO CONTENT USING VARIABLE FIELD OF VIEW

FIELD

This disclosure relates to modifying audio content to match the field of view of the visual content.

BACKGROUND

An image capture device may capture visual content that has a field of view. The image capture device may capture audio content to be used with playback of the capture of the visual content. Mismatch between the field of view of the visual content and the spatiality of the audio content may be distracting and/or undesirable.

SUMMARY

This disclosure relates to dynamically modifying audio content using variable field of view. Visual information, audio information, and/or other information may be obtained. The visual information may define visual content captured by one or more image sensors of an image capture device during a capture duration. The audio information may define multiple audio content captured by multiple sound sensors of the image capture device during the capture duration. The multiple audio content may include first audio content captured by a first sound sensor of the image capture device, second audio content captured by a second sound sensor of the image capture device, third audio content captured by a third sound sensor of the image capture device, and/or other audio content. Field of view of the visual content may be determined. Modified audio content may be generated from the multiple audio content based on the field of view of the visual content and/or other information. The modified audio content may provide sound for playback of the visual content with the field of view.

A system that dynamically modifies audio content using variable field of view may include one or more electronic storages, one or more processors, and/or other components. An electronic storage may store visual information defining visual content, information relating to visual content, information relating to field of view of the visual content, information relating to image sensor(s), audio information, information relating to audio content, information relating to sound sensors, information relating to modified audio content, and/or other information. In some implementations, the system may include one or more optical elements, one or more image sensors, three or more sound sensors, and/or other components.

One or more components of the system may be carried by a housing, such as a housing of an image capture device. For example, the optical element(s), the image sensor(s), and/or the sound sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate dynamically modifying audio content using variable field of view. The machine-readable instructions may include one or more computer program components. The computer program components may include one or more of a visual information component, an audio information component, a field of view component, a modification component, and/or other computer program components.

The visual information component may be configured to obtain visual information and/or other information. The visual information may define visual content captured by one or more image sensors of an image capture device. The visual content may be captured during one or more capture durations. In some implementations, the visual content may have a progress length.

The audio information component may be configured to obtain audio information and/or other information. The audio information may define multiple audio content captured by multiple sound sensors of the image capture device. The multiple audio content may be captured during the capture duration(s). The multiple audio content may include first audio content captured by a first sound sensor of the image capture device, second audio content captured by a second sound sensor of the image capture device, third audio content captured by a third sound sensor of the image capture device, and/or other audio content.

The field of view component may be configured to determine field of view of the visual content. In some implementations, the field of view of the visual content may be set based on capture of the visual content through one or more optical elements of the image capture device. In some implementations, the field of view of the visual content may be set based on one or more zoom settings for the capture of the visual content. In some implementations, the field of view of the visual content may be set based on a punchout of the visual content.

In some implementations, the visual content may have a progress length, and the field of view of the visual content may change during the progress length.

The modification component may be configured to generate modified audio content. The modified audio content may be generated from the multiple audio content based on the field of view of the visual content and/or other information. The modified audio content may provide sound for playback of the visual content with the field of view.

In some implementations, the modified audio content may be generated to match the field of view of the visual content. In some implementations, the modified audio content may be generated to match the changes in the field of view of the visual content.

In some implementations, the modified audio content may be generated using beamforming.

In some implementations, the generation of the modified audio content from the multiple audio content based on the field of view of the visual content may include modification of the multiple audio content based on a size of the field of view and/or other information. In some implementations, the generation of the modified audio content from the multiple audio content based on the field of view of the visual content may include modification of the multiple audio content further based on a center of the field of view and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
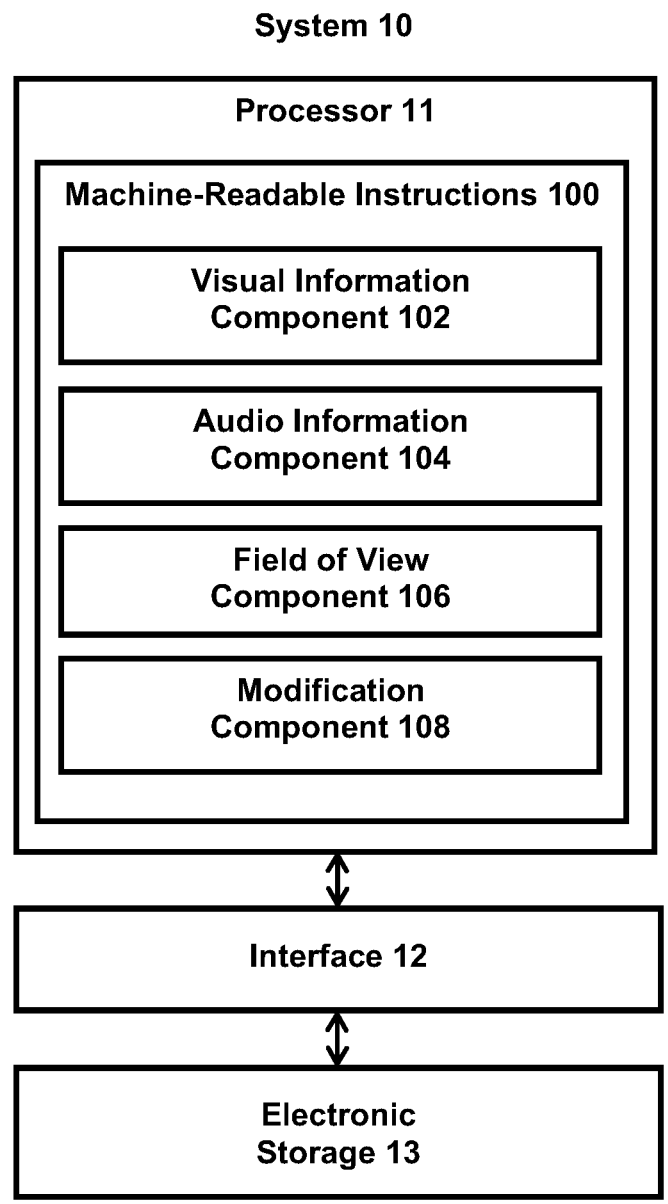
FIG. 1 illustrates an example system for dynamically modifying audio content using variable field of view.

FIG. 1 illustrates a system 10 for dynamically modifying audio content using variable field of view. The system 10 may include one or more of a processor 11, an interface 12 (e.g., bus, wireless interface), an electronic storage 13, and/or other components. In some implementations, the system 10 may include one or more optical elements, one or more image sensors, three or more sound sensors, and/or other components. Visual information, audio information, and/or other information may be obtained by the processor 11. The visual information may define visual content captured by one or more image sensors of an image capture device during a capture duration. The audio information may define multiple audio content captured by multiple sound sensors of the image capture device during the capture duration. The multiple audio content may include first audio content captured by a first sound sensor of the image capture device, second audio content captured by a second sound sensor of the image capture device, third audio content captured by a third sound sensor of the image capture device, and/or other audio content. Field of view of the visual content may be determined by the processor 11. Modified audio content may be generated by the processor 11 from the multiple audio content based on the field of view of the visual content and/or other information. The modified audio content may provide sound for playback of the visual content with the field of view.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to field of view of the visual content, information relating to image sensor(s), audio information, information relating to audio content, information relating to sound sensors, information relating to modified audio content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/ sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or sound sensor(s), of the system 10 may be carried by the housing of the image capture device. The housing may carry other components, such as the processor 11 and/or the electronic storage 13.

Figure 3:
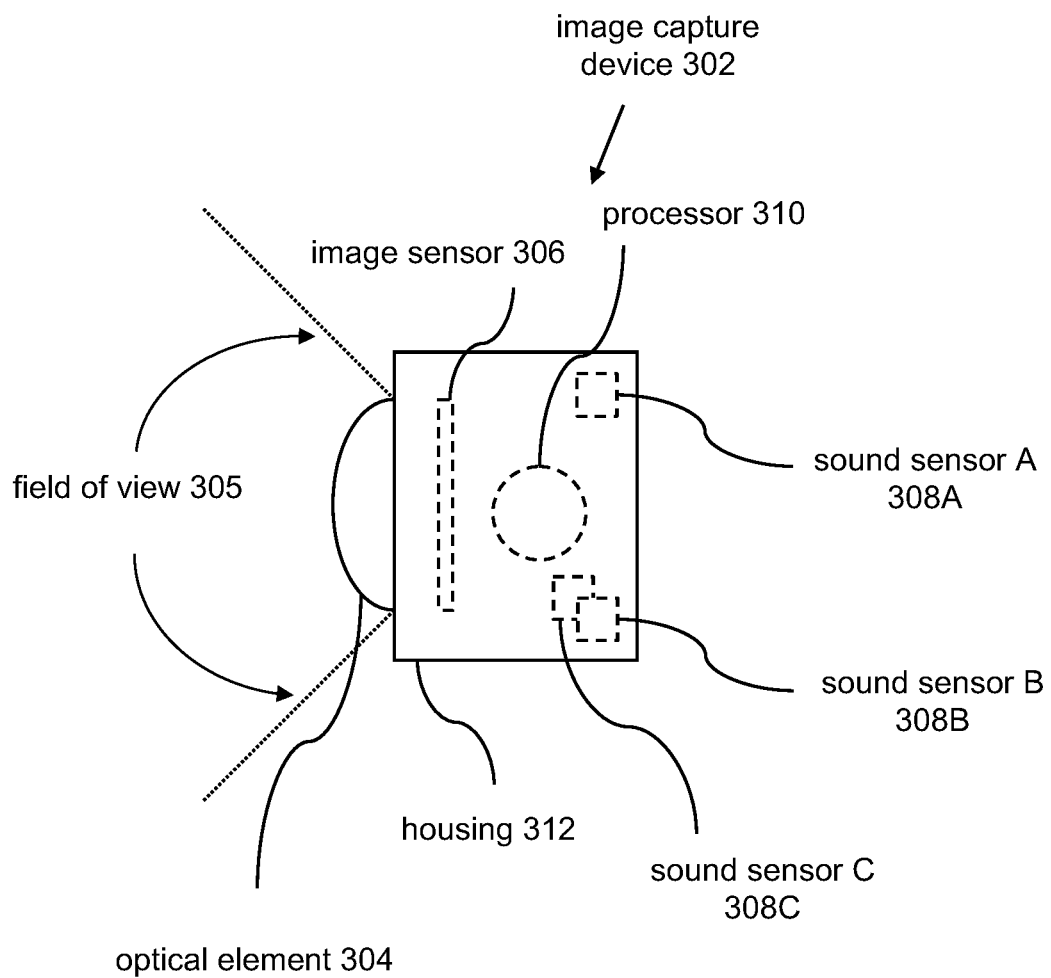
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a sound sensor A 308A, a sound sensor B 308B, a sound sensor C 308C, a processor 310, and/or other components. One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The sound sensor A 308A, the sound sensor B 308B, and the sound sensor C 308C may include sensor(s) (e.g., microphone, component(s) of microphone) that converts received sounds into output signals. The output signals may include electrical signals. The sound sensors 308A, 308B, 308C may generate output signals conveying information based on sounds received by the sound sensors 308A, 308B, 308C. For example, the sound sensor 308A may be configured to generate a sound output signal conveying audio information based on the received sounds. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats. The audio information may be stored in one or more locations, such as an electronic storage, storage of the sound sensors 308A, 308B, 308C, remote storage, and/or other locations.

While the image capture device 302 is shown with three sound sensors in FIG. 3, this is merely as an example and is not meant to be limiting. In some implementations, the image capture device 302 may have other numbers of sound sensors (e.g., two sound sensors, six sound sensors). In some implementations, the sound sensors may be omni-directional sound sensors. The omni-directional sound sensors may capture sound equally from all direction. In some implementations, the sound sensors may be Ambisonic microphones. The ambisonic microphones may capture sound using an Ambisonic format. The orientation/positioning of the sound sensors in/on the image capture device 302 may be fixed. The sound sensors may be positioned/oriented in/on the image capture device 302 to enable processing of audio content from different directions. Audio content captured by the sound sensors may be processed to simulate sounds captured from one or more particular directions. In some implementations, the sound sensors may be positioned/oriented in/on the image capture device 302 to enable/improve other types of audio processing, such as wind minimization (reduction of sound of wind in the audio content)

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensors 308A, 308B, 308C (e.g., change how the received sound is converted into information that defines audio content and/or how the audio content post-processed after capture).

The processor 310 may obtain information from the image sensor 306 and/or the sound sensors 308A, 308B, 308C, and/or facilitate transfer of information from the image sensor 306 and/or the sound sensors 308A, 308B, 308C to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may allow a user to change the field of view of the visual content captured by the image capture device 302. For example, a user may change the field of view 305 of the optical element 304 by installing a specific optical element with a particular field of view (e.g., using interchangeable prime lens with different fields of view), by using an optical element with adjustable field of view (e.g., using a zoom lens), using a digital zoom, editing the visual content to a particular field of view (e.g., punchout of a smaller portion of the visual content), and/or combination thereof. Other changes in the field of view of the visual content are contemplated.

The image capture device 302 may capture visual content and multiple audio content during a capture duration. The multiple audio content may be captured by an array of sound sensors. Separate audio content may be captured by separate sound sensors of the image capture device 302. The visual content, the multiple audio content, and/or other content may be captured by the image capture device 302 for generation of video content.

The field of view of the visual content (e.g., size, vertical length, horizontal length, diagonal length, center position) may be determined, and the field of view of the visual content may be used to generate modified audio content from the multiple audio content. The modified audio content may be generated from the multiple audio content to match the field of view of the visual content. The modified audio content may provide audio for playback of the visual content. For example, the multiple audio content captured by the separate audio sensors may be processed to stereo (L/R) signals, with the amount and/or characteristics of the L/R signals being dependent on the field of view of the visual content. Such modified audio may simulate sounds that would have been captured from the field of view of the visual content. Such modified audio content may better compliment the playback of the visual content rather than audio content captured from other directions (e.g., audio content captured from all direction).

For example, if the visual content has a narrow field of view (e.g., 30 degrees), then use of audio content captured from all around the image capture device may not match what has been captured in the visual content. By generating modified audio content that matches the field of view of the visual content (e.g., processing the multiple audio content to simulate audio content that would have been captured within 30 degrees in front of the image capture device), the visual content may be played with audio content that matches what has been captured in the visual content.

Referring back to FIG. 1, the processor 11 (or one or more components of the processor 11) may be configured to obtain information to facilitate dynamically modifying audio content using variable field of view. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamically modifying audio content using variable field of view. The machine-readable instructions 100 may include one or more computer program components. The machine-readable instructions 100 may include one or more of a visual information component 102, an audio information component 104, a field of view component 106, a modification component 108, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

Visual information may be obtained during acquisition of the visual content and/or after acquisition of the visual content. For example, the visual information component 102 may obtain visual information defining visual content while the visual content is being captured by one or more image sensors. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video/image editing application, video player/image viewer application), and/or other information. For example, a user interface/application may provide option(s) for a user to select one or more visual content for which modified audio content is to be generated. The visual information defining the visual content may be obtained based on the user's selection of the visual content through the user interface/application. Other selections of visual content for retrieval of visual information are contemplated.

The visual information may define visual content captured by one or more image sensors of an image capture device. For example, the visual information may define visual content captured by the image sensor 306 of the image capture device 302. The visual content may be captured during one or more capture durations. The visual content may have a progress length. The progress length of the visual content may be same as and/or determined based on the capture duration(s). For example, the progress length of the visual content may be the same as the capture duration(s) (total length of capture duration(s)) based on the capture rate (e.g., capture FPS) being the same as the playback rate (e.g., playback FPS). The progress length of the visual content may be different from the capture duration(s) based on the capture rate being different form the playback rate (e.g., fraction/multiple of the total length of the capture duration(s)). The visual content may be defined by the visual information as a function of progress through the progress length. For example, the visual information may define visual content of images/video frames, with the images/video frames being associated with different moments within the progress length.

The audio information component 104 may be configured to obtain audio information and/or other information. Obtaining audio information may include one or more of accessing, acquiring, analyzing, determining, examining, identifying, loading, locating, opening, receiving, retrieving, reviewing, selecting, storing, and/or otherwise obtaining the audio information. The audio information component 104 may obtain audio information from one or more locations. For example, the audio information component 104 may obtain audio information from a storage location, such as the electronic storage 13, electronic storage of information and/or signals generated by one or more sensors, electronic storage of a device accessible via a network, and/or other locations. The audio information component 104 may obtain audio information from one or more hardware components (e.g., a sound sensor) and/or one or more software components (e.g., software running on a computing device).

Audio information may be obtained during acquisition of multiple audio content and/or after acquisition of the multiple audio content by multiple sound sensors. For example, the audio information component 104 may obtain audio information defining audio content while the multiple audio content is being captured by an array of sound sensors (e.g., an array of three or more sound sensors). The audio information component 104 may obtain audio information defining multiple audio content after the multiple audio content has been captured and stored in memory (e.g., the electronic storage 13).

In some implementations, the audio information component 104 may obtain audio information based on user interaction with a user interface/application (e.g., video/image editing application, video player/image viewer application), and/or other information. For example, a user interface/application may provide option(s) for a user to select multiple audio content from which modified audio content is to be generated. The audio information defining the multiple audio content may be obtained based on the user's selection of the multiple audio content through the user interface/application. Other selections of multiple audio content for retrieval of audio information are contemplated.

The audio information may define multiple audio content captured by multiple sound sensors of the image capture device. For example, the audio information may define multiple audio content captured by the sound sensors 308A, 308B, 308C of the image capture device 302. For instance, the multiple audio content may include first audio content captured by the sound sensor A 308A, second audio content captured by the sound sensor B 308B, third audio content captured by the sound sensor C 308C, and/or other audio content. The multiple audio content may be captured during one or more capture durations. The audio content may be captured during capture duration(s) in which visual content is captured. Some or all of the audio content may be captured concurrently with the visual content. That is, the capture duration(s) of the audio content may be the same as or overlap with the capture duration(s) of the visual content. For example, the image capture device 302 may concurrently capture visual content and multiple audio content using the image sensor 306 and the sound sensors 308A, 308B, 308C, respectively.

The multiple audio content may have a progress length. The progress length of the multiple audio content may be same as and/or determined based on the capture duration(s). For example, the progress length of the multiple audio content may be the same as the capture duration(s) (total length of capture duration(s)) based on the capture rate being the same as the playback rate. The progress length of the multiple audio content may be different from the capture duration(s) based on the capture rate being different form the playback rate. The multiple audio content may be defined by the audio information as a function of progress through the progress length. For example, the audio information may define recorded sounds, with different time portions of recorded sounds being associated with different moments within the progress length.

The field of view component 106 may be configured to determine field of view of the visual content. Determining the field of view of the visual content may include ascertaining, establishing, extracting, finding, identifying, obtaining, and/or otherwise determining the field of view of the visual content. The field of view of the visual content may refer to the extent (e.g., amount, size) of a scene that is captured within the visual content. The field of view of the visual content may refer to the extent of the observable world that is captured within the visual content. The field of view of the visual content may refer to one or more angles (e.g., vertical angle, horizontal angle, diagonal angle) at which was received and passed on by the optical element(s) to the image sensor(s) to capture the visual content.

The field of view of the visual content may be characterized by size (e.g., angle). In some implementations, the field of view of the visual content may be characterized by a center position-center of the field of view and/or the rotation of the field of view. For example, a smaller portion of the visual content may be punched out, and the field of view of the punchout may be characterized by the size of the punchout, the center location of the punchout within the original field of view of the visual content, and/or the rotation of the punchout within the original field of view of the visual content.

Figure 4:
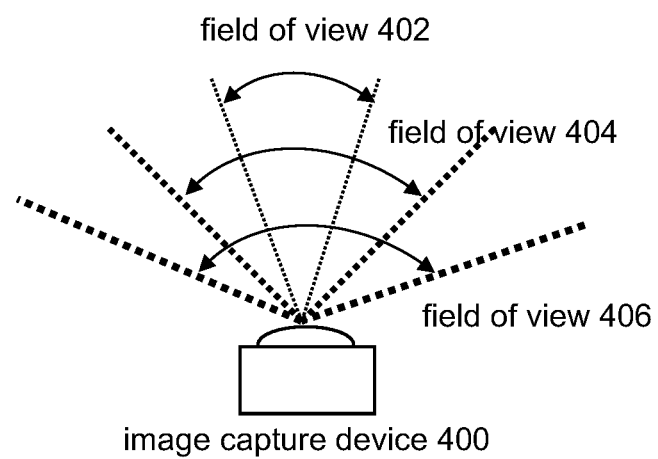
FIG. 4 illustrates example variable fields of view of an image capture device.

The field of view of the visual content may be set based on capture of the visual content, editing of the visual content, and/or other processing of the visual content. For example, the field of view of the visual content may be set based on capture of the visual content through one or more optical elements of the image capture device. The optical element(s) (e.g., lens) through which the visual content is captured may set the field of view of the visual content. For example, FIG. 4 illustrates example variable fields of view of an image capture device 400. The image capture device 400 may capture visual content having a field of view 402 (e.g., narrow field of view), a field of view 404 (e.g., medium field of view), a field of view 406 (e.g., wide field of view), and/or other field of view. For instance, the image capture device 400 may capture visual content with fields of view ranging from 27 degrees to 175 degrees using different lens attached to the image capture device 400. The user may change the field of view of visual content that is captured by switching the lens that is used.

As another example, the field of view of the visual content may be set based on one or more zoom settings for the capture of the visual content. A zoom setting may allow a user to set the optical zoom and/or digital zoom with which an image capture device captures visual content. For example, referring to FIG. 4, the user may change the zoom setting to alter the optical zoom and/or the digital zoom of the image capture device 400 to capture visual content with the field of view 402, the field of view 404, the field of view 406, and/or other field of view.

Figure 5:
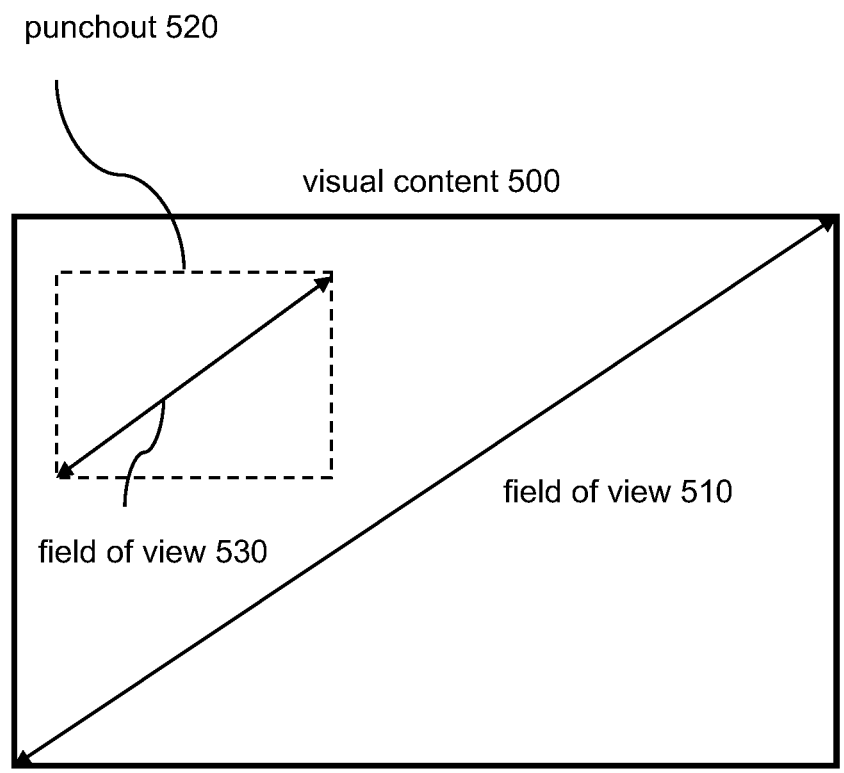
FIG. 5 illustrates an example punchout of visual content.

As yet another example, the field of view of the visual content may be set based on a punchout of the visual content. A punchout of the visual content may refer to one or more extents of the visual content that is obtained for viewing and/or extraction. The extent(s) of the visual content viewable/extracted within the punchout may be used to provide views of different spatial portions of the visual content. For example, FIG. 5 illustrates an example punchout 520 of visual content 500. The visual content 500 may have a field of view 510, and a smaller extent of the visual content may be obtained (e.g., for viewing, for storage, for use in a video edit) using the punchout 520. The punchout 520 may have a field of view 530, which is smaller than the field of view 510 of the visual content.

In some implementations, the field of view of the visual content may be determined based on analysis of the visual content. Analysis of the visual content may include examination, evaluation, processing, studying, and/or other analysis of the visual content. For example, analysis of the visual content may include examination, evaluation, processing, studying, and/or other analysis of one or more features/characteristics of the visual content. That is, the field of view component 106 may analyze the visual content to determine how much field of view is captured within the visual content.

In some implementations, the field of view of the visual content may be determined based on information on capture of the visual content. Information on the capture of the visual content may include information on optical elements (e.g., lens) used to capture the visual content, information on zoom setting (e.g., optical zoom, digital zoom) used to capture the visual content, and/or other information on the capture of the visual content. Information on the capture of the visual content may be determined based on analysis of the visual content. Information on the capture of the visual content may be stored for the visual content (e.g., in metadata of the visual content) and may be retrieved to determine the field of view of the visual content (e.g., extract field of view information from the metadata, extract information on lens/zoom used from the metadata to determine the field of view).

In some implementations, the field of view of the visual content may be determined based on information on editing of the visual content. Information on the editing of the visual content may include information on whether and/or how the field of view of the visual content was changed. Information on editing of the visual content may include information on the punchout of the visual content (e.g., size and location of the punchout). Information on the editing of the visual content may be determined based on analysis of the visual content. Information on the editing of the visual content may be stored for the visual content (e.g., in metadata of the visual content, in an edit decision list for the visual content) and may be retrieved to determine the field of view of the visual content (e.g., extract field of view information from the metadata/edit decision list). Other determination of the field of view of the visual content is contemplated.

In some implementations, the visual content may have a progress length, and the field of view of the visual content may change during the progress length. That is, rather than the field of view being static, one or more characteristics of the field of view (e.g., size, center, rotation) may change during the progress length. For example, the visual content may have been captured with different zoom at different moments during the progress length. As another example, differently sized, rotated, and/or positioned punchout may have been used. The field of view component 106 may determine the field of view at different moments within the progress length. The field of view component 106 may determine changes in the field of view during the progress length.

The modification component 108 may be configured to generate modified audio content. The modified audio content may be generated from the multiple audio content. The modified audio content may be generated by combining one or more portions of the multiple audio content. The modified audio content may be generated by using one or more portions of the multiple audio content. The modified audio content may be generated from the multiple audio content based on the field of view of the visual content and/or other information. The modified audio content may provide sound for playback of the visual content with the field of view.

The modified audio content may be generated to match the field of view of the visual content. That is, by using the field of view of the visual content to generate the modified audio content, the spatiality of the modified audio content may match the field of view of the visual content. The spatiality of the modified audio content may refer to the spatial aspect of the modified audio content, such as direction of sound source in the modified audio content. For example, the modified audio content having a narrow spatiality may include the modified audio content including and/or emplacing sounds that originated from front of the image capture device, while the modified audio content having a wide spatiality may include the modified audio content including and/or emplacing sounds that originated from front and sides of the image capture device.

For example, if the visual content is captured using a narrow field of view, the modified audio content may be generated from the multiple audio content to include and/or emphasize (e.g., increase presence/volume of) sound that was captured from a small angle (same angle as the narrow field of view; angle within a threshold value of the narrow field of view) in front of the image capture device. The modified audio content may be generated from the multiple audio content to exclude and/or deemphasize (e.g., reduce presence/volume of) sound that was captured from beyond the small angle in front of the image capture device. If the visual content is captured using a wide field of view, the modified audio content may be generated from the multiple audio content to include and/or emphasize (e.g., increase presence/volume of) sound that was captured from a large angle (same angle as the wide field of view; angle within a threshold value of the wide field of view) in front of the image capture device. The modified audio content may be generated from the multiple audio content to exclude and/or deemphasize (e.g., reduce presence/volume of) sound that was captured from beyond the wide angle in front of the image capture device.

In some implementations, the modified audio content may be generated to match the changes in the field of view of the visual content. If the field of view changes during the progress length of the visual content, then the modified audio content may be generated based on the changing field of view to match the changes in the field of view. That is, the spatiality of the modified audio content may change with the change in the field of view of the visual content. Such generation of modified audio content may simulate capture of audio content with the direction of audio content capture being dynamically adjusted to match the changes in the field of view of the visual content.

In some implementation, the modified audio content may be generated from the multiple audio content by using the field of view of the visual content and the positioning/orientation of the sound sensors that captured the multiple audio content. The known position/orientation of the sound sensors may be used in combination with the field of view of the visual content to process the individual ones of the multiple audio content. Individual ones of the multiple audio content may be processed based on the positioning/orientation of the sound sensors that captured the audio content and the field of view of the visual content to form audio content for playback from different directions. For example, the modified audio content may be generated to have a right channel and a left channel. The positioning/orientation of the sound sensors that captured the audio content and the field of view of the visual content may be used to include/emphasize certain sounds within the modified audio content (e.g., pick up sounds from particular directions for the left channel and the right channel) and to exclude/deemphasize certain sounds within the modified audio content (e.g., reject sounds from particular directions for the left channel and the right channel). That is, the modified audio content may be generated using the positioning/orientation of the sound sensors to generate different channels within the modified audio content that matches the field of view of the visual content.

In some implementations, the generation of the modified audio content from the multiple audio content based on the field of view of the visual content may include modification of the multiple audio content based on a size of the field of view and/or other information. Modification of the multiple audio content may include selection of one or more portions of the audio content for inclusion in the modified audio content, rejection of one or more portions of the audio content from inclusion in the modified audio content, emphasizing one or more portions of the audio content in the modified audio content, deemphasizing one or more portions of the audio content in the modified audio content, and/or other modification of the multiple audio content. The multiple audio content may be modified differently based on different size of the field of view. For example, the multiple audio content may be modified to include larger spatiality in the modified audio content based on a wide field of view (e.g., 90 degrees) of the visual content, while the multiple audio content may be modified to include smaller spatiality in the modified audio content based on a narrow field of view (e.g., 30 degrees) of the visual content.

In some implementations, the generation of the modified audio content from the multiple audio content based on the field of view of the visual content may include modification of the multiple audio content further based on a center of the field of view and/or other information. The center of the field of view may refer to the center position of the field of view. In some implementations, the center of the field of view may be at the center of the captured visual content. That is, the center of the field of view may be the center of the view that is captured within the visual content. In some implementations, the center of the field of view may not be at the center of the captured visual content. That is, the center of the field of view may not be the center of the view that is captured within the visual content. For example, referring to FIG. 5, the center of the field of view 530 may not be at the center of the visual content 500. Use of the center of the field of view to generate the modified visual content may allow for control in determining not just the width (e.g., how wide, how narrow) of the spatiality of the modified audio content, but also the direction of the spatiality of the modified audio content. For example, the modified audio content to match the field of view 530 may mostly include audio content captured from the left of the image capture device, with the audio content captured from far left being processed into the left channel while the audio content captured from the near left being processed into the right channel.

In some implementations, the modified audio content may be generated using beamforming. Beamforming may utilize spatial filtering to separate components of the multiple audio content into different channels of the modified audio content. Beamforming may filter and/or combine the multiple audio content to extract (e.g., constructively combine) the desired components of the multiple audio content and/or reject (e.g., destructively combine) the undesired components (e.g., interfering components) of the multiple audio content in accordance with their spatial locations. For example, by using beamforming, the sounds that arrived at the image capture device/the sound sensors of the image capture device from within the field of view of the visual content may be extracted while sounds that arrived at the image capture device/the sound sensors of the image capture device from outside the field of view of the visual content may be rejected.

In some implementations, the modified audio content may be generated using Ambisonics. The multiple audio content may be stored and/or processed using the Ambisonics format, and the modified audio content may be generated to match the field of view of the visual content by using one or more virtual microphones to determine which portions of the multiple audio content should be included/emphasized in the modified audio content and which portions of the multiple audio content should be excluded from/deemphasized in the modified audio content. Use of other techniques to generate modified audio content is contemplated.

Figure 6A:
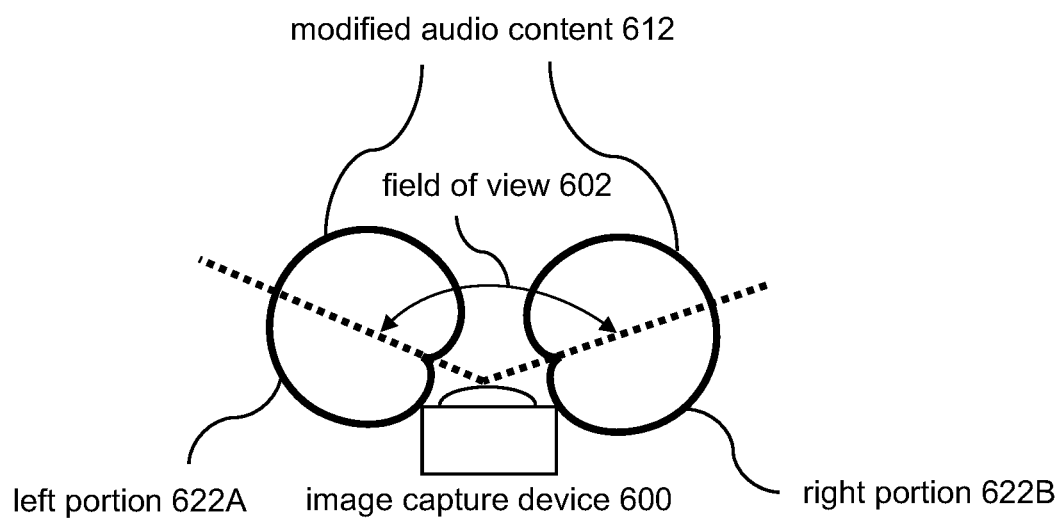
FIGS. 6A, 6B, and 6C illustrate example modified audio content that matches field of view of the visual content.
Figure 6B:
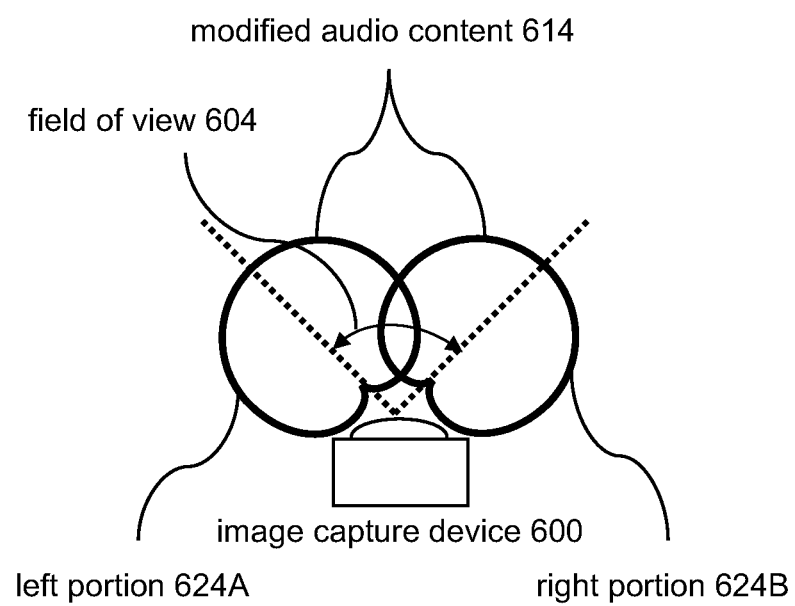
Figure 6C:
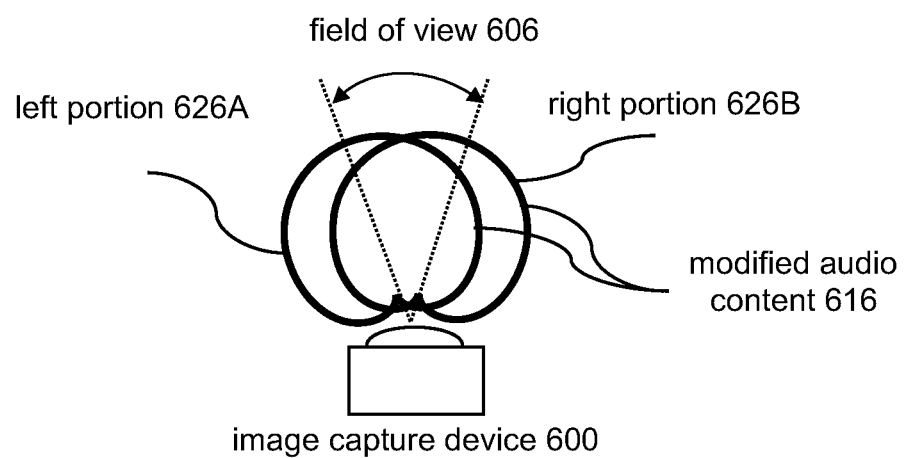

FIGS. 6A, 6B, and 6C illustrate example modified audio content that matches field of view of the visual content. The modified audio content in FIGS. 6A, 6B, and 6C may have two channels: a left channel and a right channel. The modified audio content may be generated to have two channels or other number of channels. For example, the modified audio content may be generated to have a single channel or more than two channels (e.g., front channel, left channel, back channel, right channel, top channel, bottom channel, etc.).

In FIG. 6A, modified audio content 612 may be generated for visual content captured by an image capture device 600. The visual content may have a field of view 602. The field of view 602 may be a wide field of view. The modified audio content 612 may be generated from multiple audio content captured by the image capture device 600 based on the field of view 602. The modified audio content 612 may be generated to match the field of view 602 of the visual content. The modified audio content 612 may have a left portion 622A and a right portion 622B. The left portion 622A may include/emphasize audio content captured/coming from the left side of the image capture device 600 while excluding/deemphasizing audio content captured/coming from other sides of the image capture device 600. The right portion 622B may include/emphasize audio content captured/coming from the right side of the image capture device 600 while excluding/deemphasizing audio content captured/coming from other sides of the image capture device 600. The left portion 622A and the right portion 622 may not include any overlap in their spatiality/content.

In FIG. 6B, modified audio content 614 may be generated for visual content captured by the image capture device 600. The visual content may have a field of view 604. The field of view 604 may be a medium field of view. The modified audio content 614 may be generated from multiple audio content captured by the image capture device 600 based on the field of view 604. The modified audio content 614 may have a left portion 624A and a right portion 624B. The left portion 624A may include/emphasize audio content captured/coming from the front-left side of the image capture device 600 while excluding/deemphasizing audio content captured/coming from other sides of the image capture device 600. The right portion 624B may include/emphasize audio content captured/coming from the front-right side of the image capture device 600 while excluding/deemphasizing audio content captured/coming from other sides of the image capture device 600. The left portion 624A and the right portion 624 may include some overlap in their spatiality/content. For example, audio content captured/coming from directly in front of the image capture device 600 may be included/emphasized in both the left portion 624A and the right portion 624B.

In FIG. 6C, modified audio content 616 may be generated for visual content captured by the image capture device 600. The visual content may have a field of view 606. The field of view 606 may be a narrow field of view. The modified audio content 616 may be generated from multiple audio content captured by the image capture device 600 based on the field of view 606. The modified audio content 616 may have a left portion 626A and a right portion 626B. The left portion 626A may include/emphasize audio content captured/coming from the front-left side of the image capture device 600 while excluding/deemphasizing audio content captured/coming from other sides of the image capture device 600. The right portion 626B may include/emphasize audio content captured/coming from the front-right side of the image capture device 600 while excluding/deemphasizing audio content captured/coming from other sides of the image capture device 600. The modified audio content 616 may exclude/deemphasize more of the audio captured/coming from non-front direction than the modified audio content 614 in FIG. 6B. The left portion 626A and the right portion 626 may include some overlap in their spatiality/content. For example, audio content captured/coming from directly in front of the image capture device 600 may be included/emphasized in both the left portion 626A and the right portion 626B. The modified audio content 616 may include more overlap between the portions than the modified audio content 614 in FIG. 6B.

In some implementations, the audio content may be modified to reduce the presence of one or more voice commands within the modified audio content. A voice command may refer to one or more words, phrases, sounds, and/or other audible commands that is associated with one or more operations of the image capture device. Detection of the voice command by the image capture device may cause the image capture device to perform the associated operation (s). A voice command may be recorded and/or detected by one or more sound sensors, such as a sound sensor of the image capture device. Audio content may include a voice command based on the voice command being spoken during capture duration of the audio content. The audio content may include recording of words, phrases, sounds, and/or other audible commands that is spoken by one or more persons while a sound sensor is recording the audio content.

Use of the field of view to modify the audio content may result in automatic reduction of voice commands within the modified audio content. It may be undesirable to include voice commands during playback of the visual content. Voice commands may be spoken by a user carrying the image capture device. For example, the image capture device may be held in the user's hand or mounted on the user's body (e.g., mounted on the user's head/helmet, body/chest-mount). The user may be outside the field of view of the visual content (e.g., below the field of view, behind the field of view). Use of the field of view to modify the audio content as disclosed herein may automatically reduce (e.g., remove from modified audio content, reduce the volume in the modified audio content) voice commands spoken by the user while outside the field of view of the visual content.

While the present disclosure is described with respect to reducing presence of voice command within audio content, the present disclosure may be applied to reduce other types of sound within audio content. For example, the disclosure herein may be utilized to reduce other sound associated with operation of image capture device within audio content. For instance, the image capture device may produce sounds during operation, such as beeps, tones, vibration (e.g., from a haptic motor), and/or other sounds. For example, the image capture device may produce such sounds to notify the user about operations being performed by the image capture device. Sound associated with operation(s) of the image capture device may be located within the audio content. The audio content may be modified to reduce presence of the sound within the audio content. The types/qualities of and/or timing of such sound may be known, and information about the types/qualities and/or the timing of the sounds may be used to locate and/or reduced the presence of such sound within the audio content. Modification of the audio content to reduce presence of other types of sound is contemplated.

Video content may be generated to include the visual content, the modified audio content, and/or other content. The video content may define visual content viewable as a function of progress through a progress length of the video content. The visual content may be defined within one or more video frames of the video content. The visual content defined by the visual information may form the visual content of the video frame(s) of the video content. The visual content defined by the visual information may be used to generate the visual content of the video frame(s) of the video content. The modified audio content may provide sound for playback of the visual content with the field of view. Using the modified audio content to generate the video content may enable generation of video content with audio content that matches the field of view of the visual content. Playback of such video content may be more engaging than video content in which the audio content does not match the field of view of the visual content.

The video content, the modified audio content, and/or other information may be stored in one or more storage media. For example, the video content and/or modified audio content may be stored in the electronic storage 13, remote storage locations (storage media located at/accessible through a server), and/or other locations. In some implementations, the video content and/or modified audio content may be store through one or more intermediary devices. For example, the processor 11 may be located within a computing device without a and/or modified audio content connection to the storage device (e.g., the computing device lacks WiFi/cellular connection to the storage device). The video content may be stored through another device that has the necessary connection to the storage device(e.g., the computing device using a WiFi/cellular connection of a paired mobile device, such as a smartphone, tablet, laptop, to store information in one or more storage media). Other storage locations for and storage of the video content and/or modified audio content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
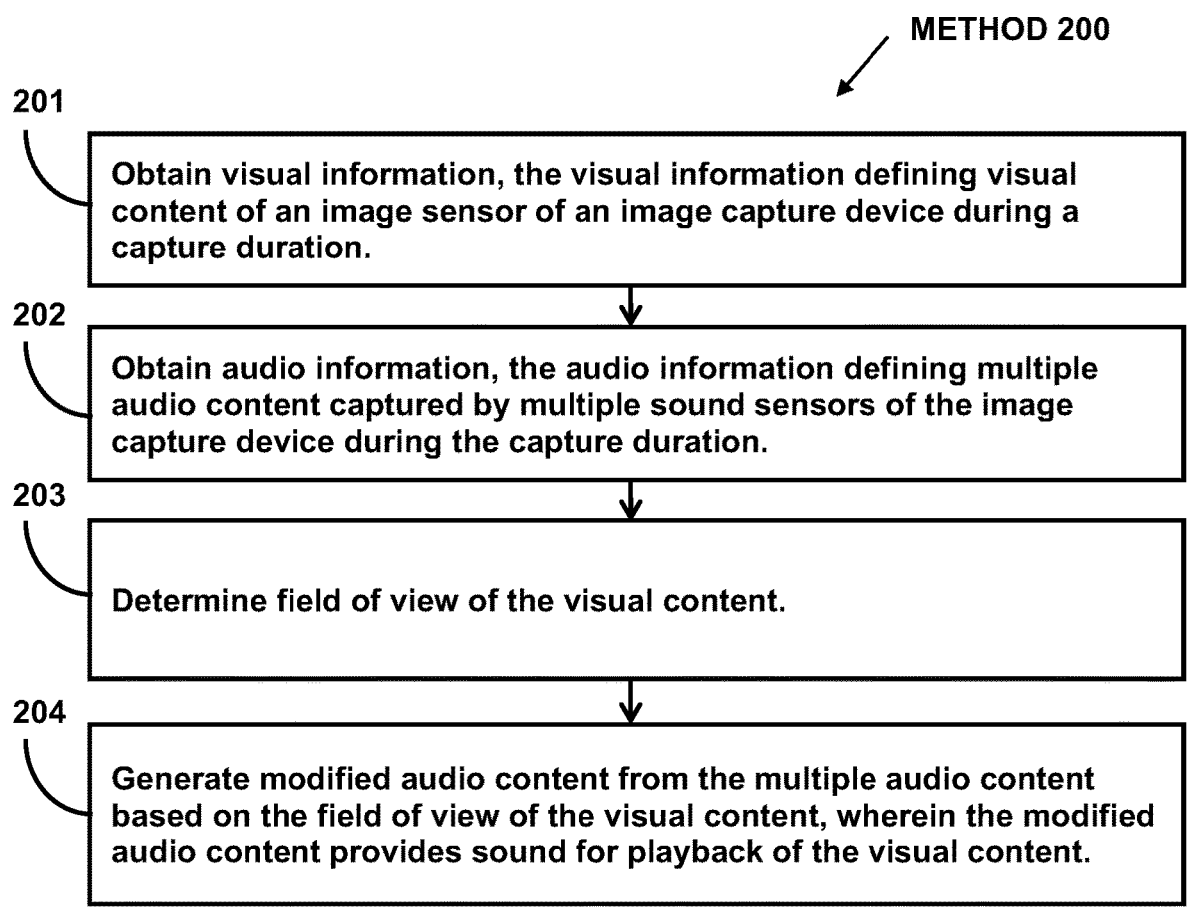
FIG. 2 illustrates an example method for dynamically modifying audio content using variable field of view.

FIG. 2 illustrates method 200 for dynamically modifying audio content using variable field of view. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content captured by an image sensor of an image capture device during a capture duration. In some implementations, operation 201 may be performed by a processor component the same as or similar to the visual information component 102 (Shown in FIG. 1 and described herein).

At operation 202, audio information may be obtained. The audio information may define multiple audio content captured by multiple sound sensors of the image capture device during the capture duration. The multiple audio content may include first audio content captured by a first sound sensor of the image capture device, second audio content captured by a second sound sensor of the image capture device, third audio content captured by a third sound sensor of the image capture device, and/or other audio content. In some implementations, operation 202 may be performed by a processor component the same as or similar to the audio information component 104 (Shown in FIG. 1 and described herein).

At operation 203, field of view of the visual content may be determined. In some implementations, operation 203 may be performed by a processor component the same as or similar to the field of view component 106 (Shown in FIG. 1 and described herein).

At operation 204, modified audio content may be generated from the multiple audio content based on the field of view of the visual content. The modified audio content may provide sound for playback of the visual content with the field of view. In some implementations, operation 204 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamically modifying audio content using variable field of view, the system comprising:
one or more physical processors configured by machine-readable instructions to:
obtain visual information, the visual information defining visual content captured by an image sensor of an image capture device during a capture duration, the visual content having a progress length, the visual content having a field of view based on capture through an optical element of the image capture device, wherein information on the capture of the visual content through the optical element of the image capture device is stored as metadata of the visual content, further wherein edit information for the visual content is stored as additional metadata of the visual content, the edit information including information on changes in size and/or location of a punchout of the visual content during the progress length of the visual content, the punchout of the visual content including an extent of the visual content for viewing or extraction, the punchout of the visual content being smaller than the field of view of the visual content;
obtain audio information, the audio information defining multiple audio content captured by multiple sound sensors of the image capture device during the capture duration, the multiple audio content including first audio content captured by a first sound sensor of the image capture device, second audio content captured by a second sound sensor of the image capture device, and third audio content captured by a third sound sensor of the image capture device; and
generate modified audio content from the multiple audio content based on the information on the changes in the size and/or the location of the punchout of the visual content stored as the additional metadata of the visual content to match the changes in the size and/or the location of the punchout of the visual content, wherein the modified audio content provides sound for playback of the punchout of the visual content.

2. The system of claim 1, wherein the size and/or the location of the punchout of the visual content are determined based on analysis of the visual content.

3. A system for dynamically modifying audio content using variable field of view, the system comprising:
one or more physical processors configured by machine-readable instructions to:
obtain visual information, the visual information defining visual content captured by an image sensor of an image capture device during a capture duration, the visual content having a field of view based on capture through an optical element of the image capture device, wherein information on the capture of the visual content through the optical element of the image capture device is stored as metadata of the visual content, further wherein edit information for the visual content is stored as additional metadata of the visual content, the edit information including information on size and location of a punchout of the visual content, the punchout of the visual content including an extent of the visual content for viewing or extraction, the punchout of the visual content being smaller than the field of view of the visual content;
obtain audio information, the audio information defining multiple audio content captured by multiple sound sensors of the image capture device during the capture duration, the multiple audio content including first audio content captured by a first sound sensor of the image capture device, second audio content captured by a second sound sensor of the image capture device, and third audio content captured by a third sound sensor of the image capture device; and
generate modified audio content from the multiple audio content based on the information on the size and the location of the punchout of the visual content stored as the additional metadata of the visual content to match the size and the location of the punchout of the visual content, wherein the modified audio content provides sound for playback of the punchout of the visual content.

4. The system of claim 3, wherein the size and the location of the punchout of the visual content are determined based on analysis of the visual content.

5. The system of claim 3, wherein the visual content has the field of view further based on a zoom setting for the capture of the visual content.

6. The system of claim 3, wherein the edit information is further stored within an edit decision list for the visual content.

7. The system of claim 3, wherein the edit information further includes information on rotation of the punchout, and the modified audio content is generated further based on the rotation of the punchout.

8. The system of claim 3, wherein:
the visual content has a progress length;
the size and/or the location of the punchout of the visual content changes during the progress length; and
the modified audio content is generated to match the changes in the size and/or the location of the punchout of the visual content.

9. The system of claim 3, wherein the modified audio content is generated using beamforming.

10. The system of claim 3, wherein the generation of the modified audio content from the multiple audio content based on the information on the size and the location of the punchout of the visual content includes modification of the multiple audio content based on the size of the punchout of the visual content.

11. The system of claim 10, wherein the generation of the modified audio content from the multiple audio content based on the information on the size and the location of the punchout of the visual content includes modification of the multiple audio content further based on a center of the punchout of the visual content.

12. A method for dynamically modifying audio content using variable field of view, the method performed by a computing system including one or more processors, the method comprising:
obtaining, by the computing system, visual information, the visual information defining visual content captured by an image sensor of an image capture device during a capture duration, the visual content having a field of view based on capture through an optical element of the image capture device, wherein information on the capture of the visual content through the optical element of the image capture device is stored as metadata of the visual content, further wherein edit information for the visual content is stored as additional metadata of the visual content, the edit information including information on size and location of a punchout of the visual content, the punchout of the visual content including an extent of the visual content for viewing or extraction, the punchout of the visual content being smaller than the field of view of the visual content;

obtaining, by the computing system, audio information, the audio information defining multiple audio content captured by multiple sound sensors of the image capture device during the capture duration, the multiple audio content including first audio content captured by a first sound sensor of the image capture device, second audio content captured by a second sound sensor of the image capture device, and third audio content captured by a third sound sensor of the image capture device; and generating, by the computing system, modified audio content from the multiple audio content based on the information on the size and the location of the punchout of the visual content stored as the additional metadata of the visual content to match the size and the location of the punchout of the visual content, wherein the modified audio content provides sound for playback of the punchout of the visual content.

13. The method of claim 12, wherein the size and the location of the punchout of the visual content are determined based on analysis of the visual content.

14. The method of claim 12, wherein the visual content has the field of view further based on a zoom setting for the capture of the visual content.

15. The method of claim 12, wherein the edit information is further stored within an edit decision list for the visual content.

16. The method of claim 12, wherein the edit information further includes information on rotation of the punchout, and the modified audio content is generated further based on the rotation of the punchout.

17. The method of claim 12, wherein:
the visual content has a progress length;
the size and/or the location of the punchout of the visual content changes during the progress length; and
the modified audio content is generated to match the changes in the size and/or the location of the punchout of the visual content.

18. The method of claim 12, wherein the modified audio content is generated using beamforming.

19. The method of claim 12, wherein generating the modified audio content from the multiple audio content based on the information on the size and the location of the punchout of the visual content includes modifying the multiple audio content based on the size of the punchout of the visual content.

20. The method of claim 19, wherein generating the modified audio content from the multiple audio content based on the information on the size and the location of the punchout of the visual content includes modifying the multiple audio content further based on a center of the punchout of the visual content.

* * * * *